United States Patent
Javil et al.

(10) Patent No.: US 7,844,510 B2
(45) Date of Patent: Nov. 30, 2010

(54) METHOD AND SYSTEM FOR DETERMINING ABSORPTION COSTING SEQUENCES FOR ITEMS IN A BUSINESS OPERATION

(75) Inventors: Veeresha Javil, Redwood City, CA (US); Lina C. Velasquez, San Carlos, CA (US); Vinayak Kamath, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 11/394,045

(22) Filed: Mar. 29, 2006

(65) Prior Publication Data
US 2006/0235772 A1    Oct. 19, 2006

Related U.S. Application Data

(63) Continuation-in-part of application No. 11/100,196, filed on Apr. 5, 2005.

(51) Int. Cl.
*G07B 17/00* (2006.01)
*G06Q 10/00* (2006.01)

(52) U.S. Cl. .......................................... 705/30; 705/28
(58) Field of Classification Search ............... 705/30, 705/28
See application file for complete search history.

(56) References Cited

U.S. PATENT DOCUMENTS

| | | | | | |
|---|---|---|---|---|---|
| 5,249,120 | A | * | 9/1993 | Foley .............................. | 705/1 |
| 5,675,785 | A | * | 10/1997 | Hall et al. ..................... | 707/102 |
| 5,970,465 | A | * | 10/1999 | Dietrich et al. ................ | 705/7 |
| 6,356,880 | B1 | * | 3/2002 | Goossens et al. .............. | 705/30 |
| 6,560,508 | B1 | * | 5/2003 | Radican ....................... | 700/214 |
| 6,701,201 | B2 | * | 3/2004 | Hegde et al. ................. | 700/107 |
| 6,775,647 | B1 | * | 8/2004 | Evans et al. ..................... | 703/7 |
| 6,829,604 | B1 | * | 12/2004 | Tifft .............................. | 707/5 |
| 6,947,951 | B1 | * | 9/2005 | Gill .......................... | 707/104.1 |

(Continued)

FOREIGN PATENT DOCUMENTS

EP    1362542 A1 * 11/2003

OTHER PUBLICATIONS

Emblemsvag, Jan, Activity Based Life-Cycle Costing, 2001, Managerial Auditing Journal pp. 17-27.*

(Continued)

*Primary Examiner*—Matthew S Gart
*Assistant Examiner*—Ashford S Hayles
(74) *Attorney, Agent, or Firm*—Townsend and Townsend and Crew, LLP

(57) ABSTRACT

Embodiments of the present invention are directed to a method and system for determining an absorption costing sequence for items in a business operation. More specifically, embodiments provide an efficient mechanism for sequencing items for absorption costing, thereby also improving the efficiency of subsequent absorption costing mechanisms by reducing the number of sequencing operations performed during costing. In one embodiment, an initial hierarchy is created from a bill of materials (BOM) including items for which an absorption cost will be calculated. Thereafter, an iterative method is performed to modify the initial hierarchy and reposition each parent item at a level above all of the children items corresponding to the parent item. An absorption processing sequence for the items is then determined from the modified hierarchy. As such, all items may be efficiently repositioned before absorption costing is performed.

18 Claims, 6 Drawing Sheets

U.S. PATENT DOCUMENTS

| | | | |
|---|---|---|---|
| 6,970,841 B1* | 11/2005 | Cheng et al. | 705/28 |
| 7,092,929 B1* | 8/2006 | Dvorak et al. | 705/28 |
| 7,177,834 B1* | 2/2007 | Maestle | 705/38 |
| 7,185,010 B2* | 2/2007 | Morinville | 707/6 |
| 7,242,992 B2* | 7/2007 | Takahashi et al. | 700/97 |
| 7,292,965 B1* | 11/2007 | Mehta et al. | 703/2 |
| 7,302,409 B2* | 11/2007 | Hayashi | 705/30 |
| 7,313,795 B2* | 12/2007 | Chew et al. | 718/104 |
| 7,516,083 B1* | 4/2009 | Dvorak et al. | 705/10 |
| 7,725,367 B2 | 5/2010 | Javli et al. | |
| 2002/0107864 A1* | 8/2002 | Battas et al. | 707/101 |
| 2002/0111886 A1* | 8/2002 | Chenevich et al. | 705/30 |
| 2003/0002445 A1* | 1/2003 | Fullana et al. | 370/241 |
| 2003/0014287 A1 | 1/2003 | Williams et al. | |
| 2003/0037014 A1* | 2/2003 | Shimizu et al. | 705/400 |
| 2003/0083888 A1* | 5/2003 | Argenton et al. | 705/1 |
| 2003/0115080 A1* | 6/2003 | Kasravi et al. | 705/1 |
| 2003/0120504 A1* | 6/2003 | Kruk et al. | 705/1 |
| 2003/0172008 A1* | 9/2003 | Hage et al. | 705/28 |
| 2003/0216977 A1* | 11/2003 | Hayashi | 705/30 |
| 2004/0260592 A1* | 12/2004 | George et al. | 705/8 |
| 2005/0065863 A1* | 3/2005 | Plumer et al. | 705/30 |
| 2005/0119951 A1* | 6/2005 | Laub et al. | 705/28 |
| 2005/0120010 A1* | 6/2005 | Philpott et al. | 707/3 |
| 2005/0283412 A1* | 12/2005 | Cheng et al. | 705/28 |
| 2006/0031084 A1* | 2/2006 | Schierholt et al. | 705/1 |
| 2006/0155655 A1* | 7/2006 | Shen | 705/400 |
| 2007/0150332 A1* | 6/2007 | Grichnik et al. | 705/10 |
| 2008/0086429 A1* | 4/2008 | Venkatraman et al. | 705/400 |
| 2008/0120129 A1* | 5/2008 | Seubert et al. | 705/1 |
| 2008/0215410 A1* | 9/2008 | Cheng et al. | 705/8 |

OTHER PUBLICATIONS

1998 Winter Simulation Conference; Proceedings of the 30th Conference on Winter Simulation, Washington D.C., United States, pp. 1387-1394.

U.S. Appl. No. 11/100,196, Office Action dated Aug. 5, 2008, 9 pages.

U.S. Appl. No. 11/100,196, Final Office Action dated Jan. 8, 2009, 10 pages.

U.S. Appl. No. 11/100,196, Advisory Action dated Mar. 30, 2009, 3 pages.

U.S. Appl. No. 11/100,196, Office Action dated Jul. 7, 2009, 9 pages.

U.S. Appl. No. 11/100,196, Notice of Allowance dated Jan. 10, 2010, 13 pages.

* cited by examiner

METHOD AND SYSTEM FOR DETERMINING ABSORPTION COSTING SEQUENCES FOR ITEMS IN A BUSINESS OPERATION

RELATED APPLICATIONS

The present application is related to U.S. patent application Ser. No. 11/393,135, filed Mar. 29, 2006, entitled "IMPROVED METHOD AND SYSTEM FOR DETERMINING ABSORPTION COSTS FOR TRANSFERS BETWEEN INVENTORY SITES OF A BUSINESS OPERATION," naming V. Javli and L. Velasquez as inventors, assigned to the assignee of the present invention. That application is incorporated herein by reference in its entirety and for all purposes.

FIELD OF THE INVENTION

Embodiments of the present invention are related to the field of determining absorption costing sequences for a business operation.

BACKGROUND OF THE INVENTION

Transferring goods between inventory sites is a common business practice for most all companies. Goods are often comprised of sub-assemblies of smaller items, which must be transferred from one inventory site to another in the process of manufacturing and distributing the goods. As such, the appropriate valuation and analysis of transferable item costs has become a key factor in successful business management. Although several costing methods exist, absorption costing is commonly used.

Absorption costing is an approach to inventory valuation that involves assigning a cost to a transferable item in inventory, where the cost is determined by summing the value of the items transferred and any freight or other charges incurred as a result of the transfer. Most all companies use computer software to perform the absorption costing analysis for transfers between various inventory sites or "cost groups." The software will perform the necessary operations to determine the average cost of each item involved, and determine an optimal sequence for the costing of each item involved.

Although the costing sequence may be relatively easy to determine in simple scenarios, the manufacture and distribution of a good comprised of many items and subassemblies often creates more complex scenarios. For example, the determination of a costing sequence is made more complicated by an item appearing in multiple levels within the bill of materials, especially when the item is transferred between multiple cost groups. Consequently, the number of operations that the software must perform in these more complex scenarios may become very large.

SUMMARY OF THE INVENTION

Accordingly, a need exists for a computer-implemented method and system that more efficiently determines an absorption costing sequence for items in a business operation. Furthermore, there is a need to sequence the items in accordance with the absorption-costing objective such that the number of operations necessary to perform subsequent absorption costing is also reduced. Embodiments of the present invention provide novel solutions to these needs and others as described below.

Embodiments of the present invention are directed to a method and system for determining an absorption costing sequence for items in a business operation. More specifically, embodiments provide an efficient mechanism for sequencing items for absorption costing, thereby also improving the efficiency of subsequent absorption costing mechanisms by reducing the number of sequencing operations performed during costing. In one embodiment, an initial hierarchy is created from a bill of materials including items for which an absorption cost will be calculated. Thereafter, an iterative method is performed to modify the initial hierarchy and reposition each parent item at a level above all of the children items corresponding to the parent item. An absorption processing sequence for the items is then determined from the modified hierarchy. As such, all items may be efficiently repositioned before absorption costing is performed.

In another embodiment, a computer-usable medium having computer-readable program code causes a computer system to perform a method in accordance with the previously-discussed embodiments. And in another embodiment, a computer system enables instructions stored in a memory to be executed on a processor to implement a method in accordance with the previously-discussed embodiments.

More specifically, one embodiment of the present invention pertains to a computer-implemented method of sequencing items for absorption costing. The method includes: creating an initial hierarchy comprising the items; modifying the initial hierarchy using an iterative process to reposition a plurality of the items, wherein the iterative process generates a modified hierarchy and includes: accessing one of the items; identifying a plurality of children items of the accessed item; and moving the accessed item to a hierarchy level above a hierarchy level containing a plurality of the children items; repeating the modifying until an iteration is completed without repositioning any of the plurality of the items; and determining an absorption costing sequence for the items from the modified hierarchy.

Other embodiments of the present invention include the above, and wherein the creating an initial hierarchy further includes: identifying a plurality of hierarchy levels for each of the items, wherein the plurality of hierarchy levels comprises a respective hierarchy level of each of the items for each respective cost group using each of the items; assigning a higher hierarchy level of the plurality of hierarchy levels to each of the items associated with more than one hierarchy level; and creating the initial hierarchy comprising an assigned hierarchy level for each of the items associated with more than one hierarchy level and one of the respective hierarchy levels for each of the items associated with only one hierarchy level.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "defining," "determining," "performing," "processing," "comparing," "repeating," "creating," "modifying," "assigning," "moving," "establishing," "using," "calculating," "adding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Figure 1:
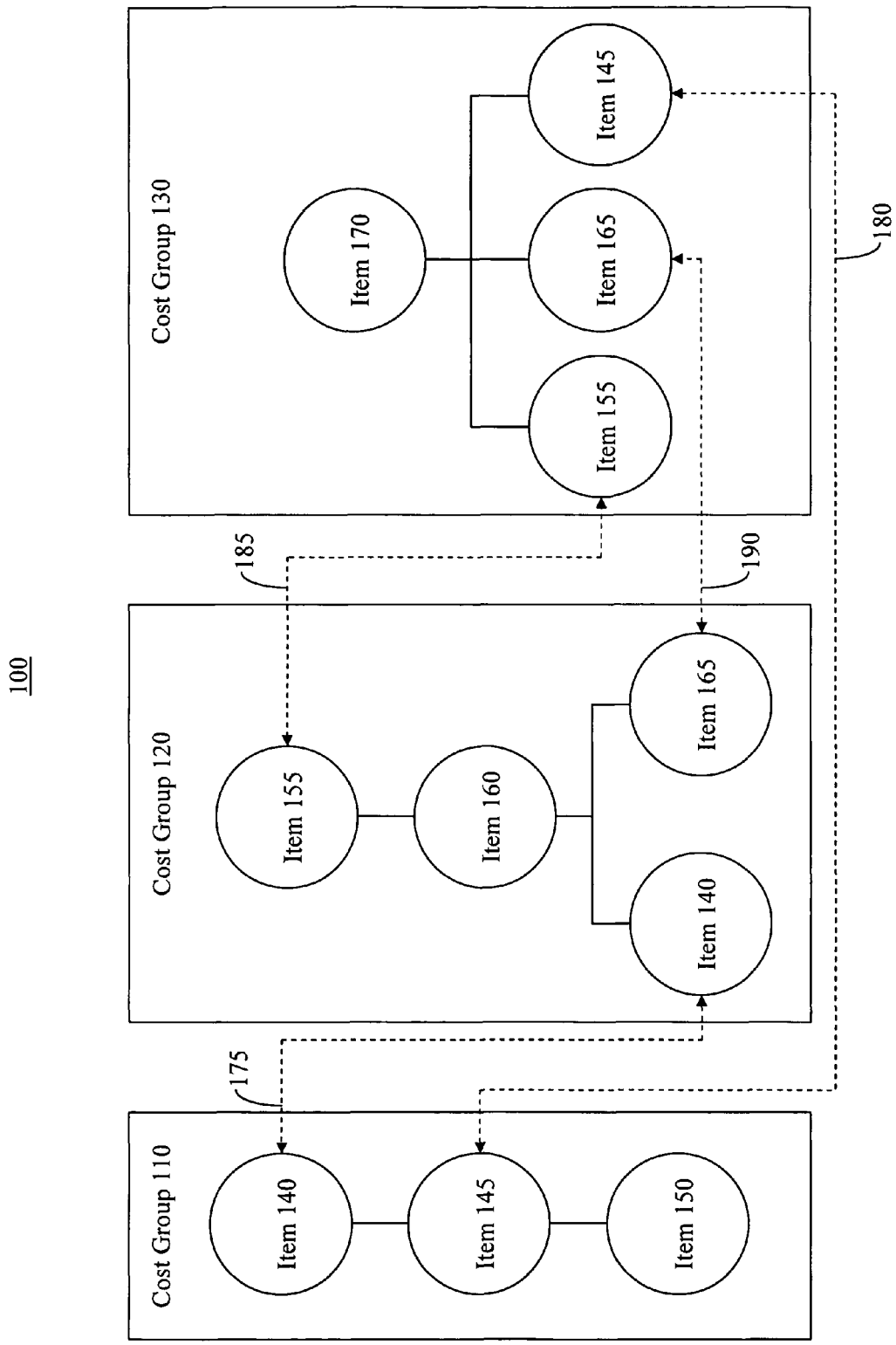
FIG. 1 shows a block diagram depicting a plurality of exemplary cost groups transferring items in accordance with one embodiment of the present invention.

FIG. 1 shows block diagram 100 depicting a plurality of exemplary cost groups transferring items in accordance with one embodiment of the present invention. As shown in FIG. 1, cost groups 110, 120 and 130 transfer items between one another. Cost group 110 contains items 140, 145 and 150, while cost group 120 contains items 140, 155, 160 and 165. Additionally, cost group 130 contains items 145, 155, 165 and 170. Accordingly, FIG. 1 depicts one embodiment of a business operation with three inventory sites, manufacturing plants or the like, which transfer items between one another to assemble and manufacture assemblies and subassemblies.

As shown in FIG. 1, children items merge into parent items to form larger assemblies and subassemblies within each cost group. For example, in one embodiment, item 145 is a parent item into which child item 150 may be merged in cost group 110. Thereafter, child item 145 may be merged into parent item 140. In another embodiment, items 140 and 165 are child items of parent item 160 within cost group 120. Similarly, parent item 155 is comprised of child item 160. In another embodiment, child items 145, 155 and 165 are merged to form parent item 170 in cost group 130.

Although FIG. 1 refers to elements (e.g., 140, 145, etc.) within each cost group as "items," it should be understood that in other embodiments the elements may be raw materials, parts, assemblies, subassemblies or the like. Moreover, although FIG. 1 depicts a single child item (e.g., 150) being merged into a parent item (e.g., 145), it should be understood that in other embodiments a parent item may include other raw materials, parts, assemblies, subassemblies or the like in addition to the child item.

As shown in FIG. 1, items may be transferred from one cost group to another, and consequently, be utilized in one or more assemblies or subassemblies. In one embodiment, item 140 may be transferred between cost groups 110 and 120 as represented by transfer 175. In another embodiment, item 145 may be transferred between cost groups 110 and 130 as represented by transfer 180. In another embodiment, item 155 may be transferred between cost groups 120 and 130 as represented by transfer 185. In another embodiment, item 165 may be transferred between costs groups 120 and 130 as represented by transfer 190. Although only four transfers are depicted in the embodiment depicted in FIG. 1, it should be understood that other embodiments may involve greater or fewer transfers between cost groups. Additionally, in other embodiments, an item may be transferred among more than two cost groups.

Although the embodiment depicted in FIG. 1 may appear to have relatively few elements or items, determining an absorption costing sequence is quite complicated. Given that the cost of a child item affects the cost of a parent item, children items should generally be costed before the corresponding parent items. However, this is further complicated by the transfer of items between cost groups such that the same item is used in more than one assembly, subassembly, or the like in multiple cost groups. Moreover, determining the appropriate absorption costing sequence becomes even more complicated when the same item occupies multiple hierarchy levels within a bill of materials (BOM) in different cost groups using the item.

A BOM may contain many hierarchy levels for each cost group. A lowest hierarchy level may contain children items that are not parent items (e.g., 150). An intermediate hierarchy level may contain items that are both parent and children items (e.g., 145). And a highest hierarchy level may contain items that are only parent items with a cost group (e.g., 140). Table 1 below shows a hierarchy derived from a BOM for the items in FIG. 1 in accordance with one embodiment of the present invention.

TABLE 1

| Item Number | Cost Group 110 BOM Level | Cost Group 120 BOM Level | Cost Group 130 BOM Level |
|---|---|---|---|
| 140 | 998 | 1000 | |
| 145 | 999 | | 1000 |
| 150 | 1000 | | |
| 155 | | 998 | 1000 |
| 160 | | 999 | |
| 165 | | 1000 | 1000 |
| 170 | | | 999 |

As shown in Table 1, items occupying the lowest BOM level are assigned to level 1000 in one embodiment. For example, items 145, 155 and 165 are child items within cost group 130, and thus, are assigned to BOM level 1000 in one embodiment. However, since item 145 is transferred between cost groups 110 and 130, item 145 may occupy a different BOM level in each cost group utilizing the item. For example, in one embodiment, item 145 may occupy BOM level 999 in cost group 110 and BOM level 1000 in cost group 130.

Figure 2:
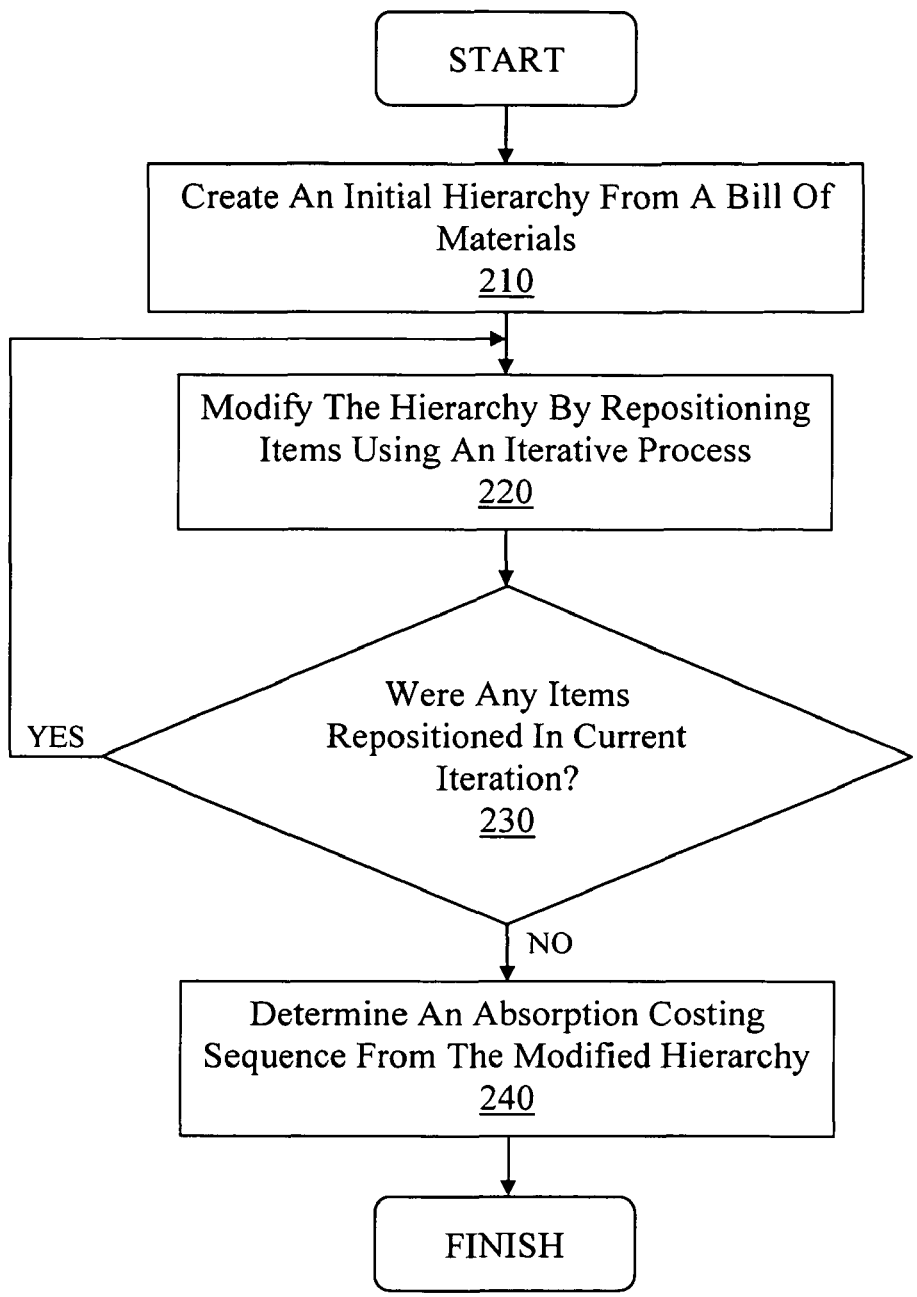
FIG. 2 shows a computer-implemented process for determining an absorption costing sequence for items transferred between a plurality of cost groups of a business operation in accordance with one embodiment of the present invention.

FIG. 2 shows computer-implemented process 200 for determining an absorption costing sequence for items transferred between a plurality of cost groups of a business operation in accordance with one embodiment of the present invention. As the steps of process 200 are described herein, reference will be made to FIG. 1 and Table 1 to provide examples and help clarify the discussion.

As shown in FIG. 2, step 210 involves creating an initial hierarchy from a BOM. In one embodiment, a BOM may first be derived from a business operation involving multiple cost groups (e.g., as shown by block diagram 100), where the cost groups may utilize a plurality of items and transfer certain items between one another. In another embodiment, a BOM may have been previously derived as part of a sales, scheduling, engineering, or other task. Once a BOM has been created or obtained, the levels within the BOM may be used to create a hierarchy similar to Table 1 in one embodiment. In one embodiment, an initial hierarchy consisting of all items is then created by assigning the highest level for each item across all cost groups to each respective item (e.g., by using a portion of process 300 shown in FIG. 3A). For example, in one embodiment, item 145 would be assigned BOM level 999 since that is the highest BOM level occupied by item 145 across cost groups 110, 120, and 130. Table 2 below shows an initial hierarchy for the items in FIG. 1 and Table 1 in accordance with one embodiment of the present invention.

TABLE 2

| Item Number | Highest BOM Level Across All Cost Groups |
|---|---|
| 140 | 998 |
| 145 | 999 |
| 150 | 1000 |
| 155 | 998 |
| 160 | 999 |

TABLE 2-continued

| Item Number | Highest BOM Level Across All Cost Groups |
|---|---|
| 165 | 1000 |
| 170 | 999 |

After an initial hierarchy is created, the hierarchy is modified by repositioning the items to prepare for absorption costing. In one embodiment, an iterative process may be used (e.g., a portion of process 300 shown in FIG. 3B) to reposition items such that all parent items are at a BOM level above all respective children items. Thereafter, in one embodiment, a determination is made after each iteration in step 230 as to whether any items were repositioned in a current iteration. Accordingly, step 220 can be repeated until an iteration is performed without repositioning any items. In one embodiment, the modified hierarchy created as a result of steps 220 and 230 may be determined an "absorption hierarchy," and therefore, contain items eligible for subsequent absorption costing (e.g., "eligible items"). Table 3 below shows a modified hierarchy after several iterations for the items in FIG. 1 and Table 2 in accordance with one embodiment of the present invention.

TABLE 3

| BOM Level | Item Number |
|---|---|
| 1000 | 150, 165 |
| 999 | 145 |
| 998 | 140 |
| 997 | 160 |
| 996 | 155 |
| 995 | 170 |

As shown in FIG. 2, step 240 involves the determination of an absorption costing sequence from a hierarchy of eligible items to be costed (e.g., that shown in Table 3). In one embodiment, items at a higher hierarchy level may be costed before items at a lower hierarchy level (e.g., in accordance with a portion of process 300 shown in FIG. 3C). Accordingly, embodiments allow the determination of an appropriate absorption costing sequence for items in a business operation in an efficient manner.

Figure 3A:
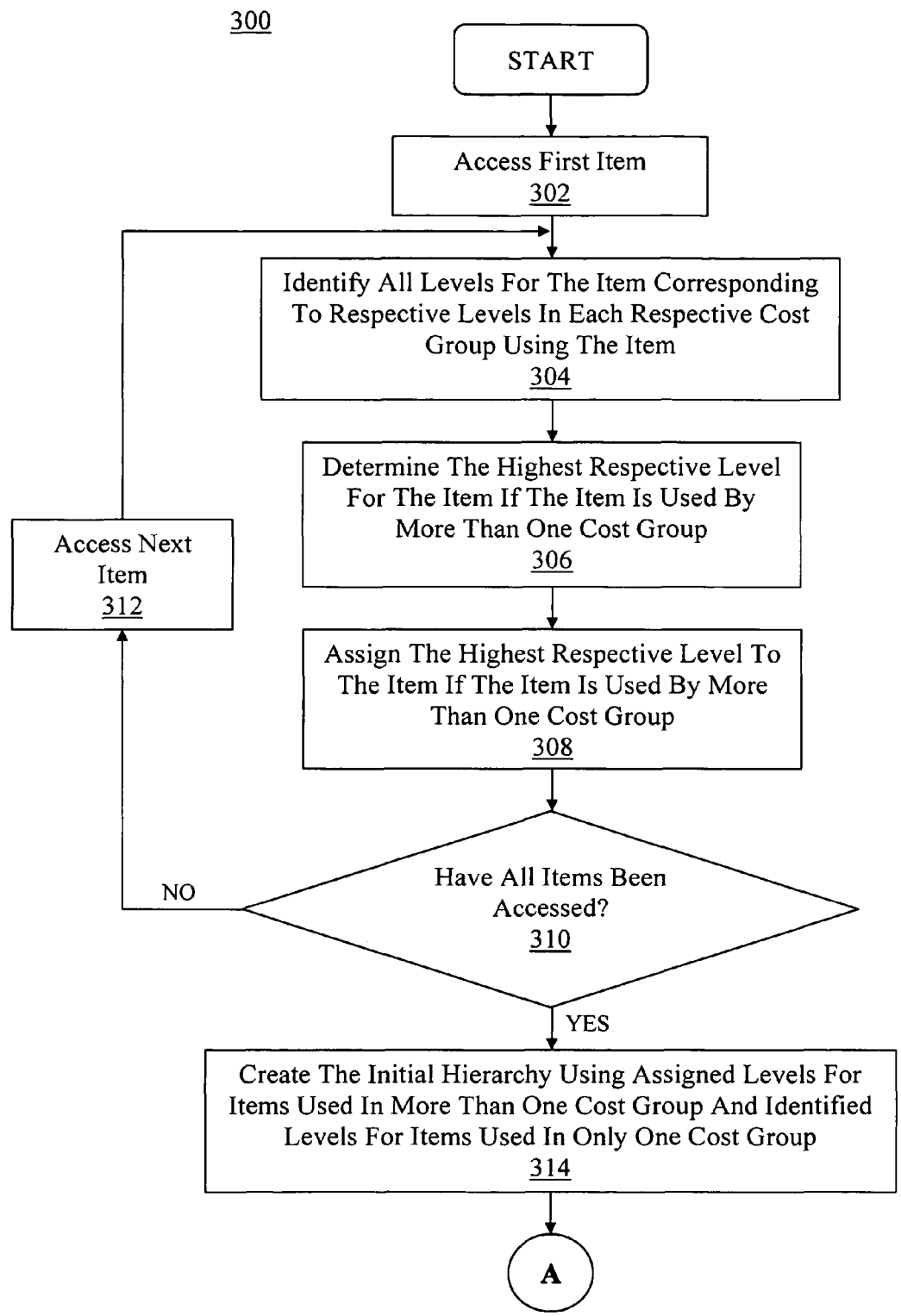
FIG. 3A shows a portion of a computer-implemented process for creating an initial hierarchy from a bill of materials for subsequent use in determining an absorption costing sequence for items transferred between a plurality of cost groups of a business operation in accordance with one embodiment of the present invention.
Figure 3B:
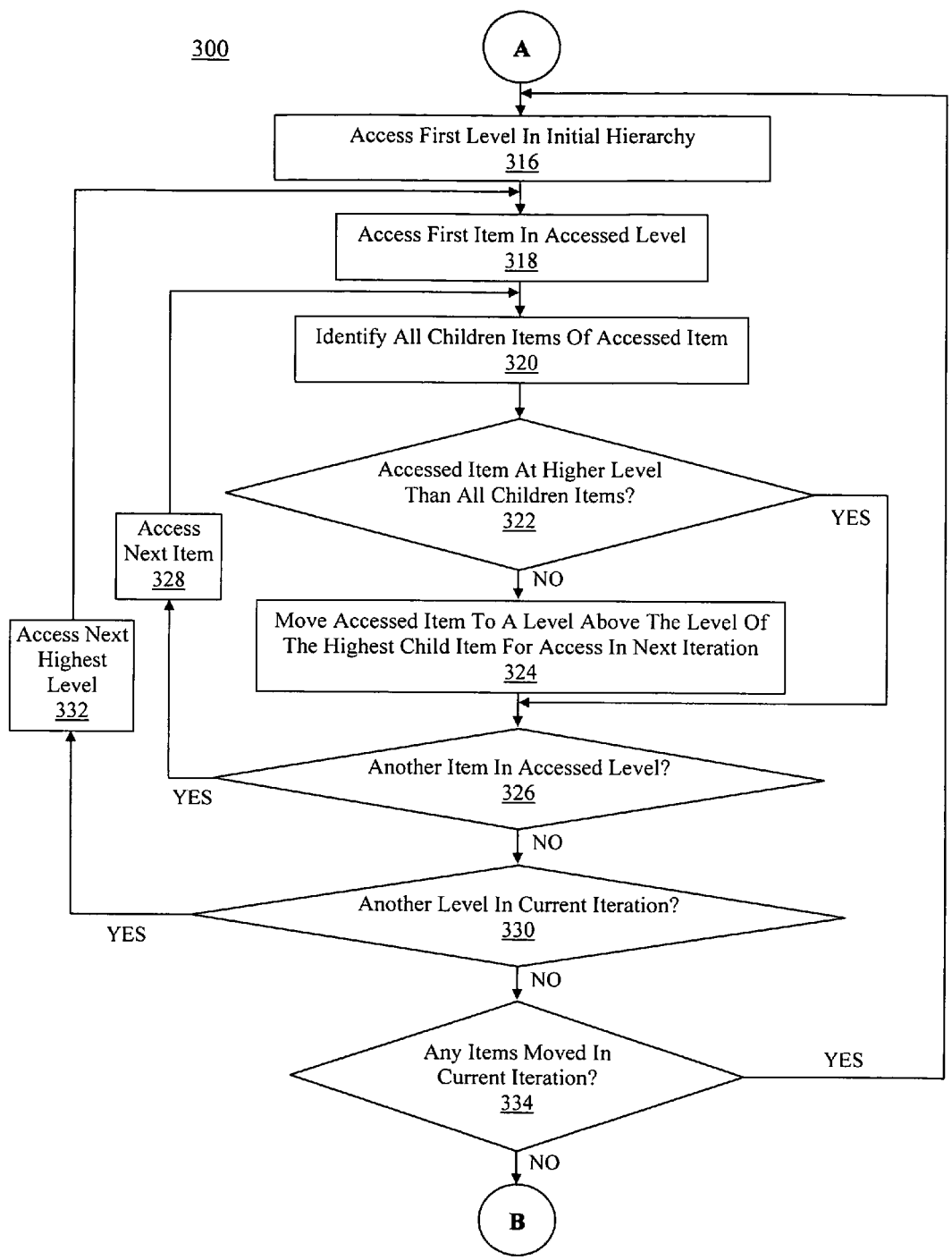
FIG. 3B shows a portion of a computer-implemented process for repositioning items in an initial hierarchy to create a modified hierarchy for subsequent use in determining an absorption costing sequence for items transferred between a plurality of cost groups of a business operation in accordance with one embodiment of the present invention.
Figure 3C:
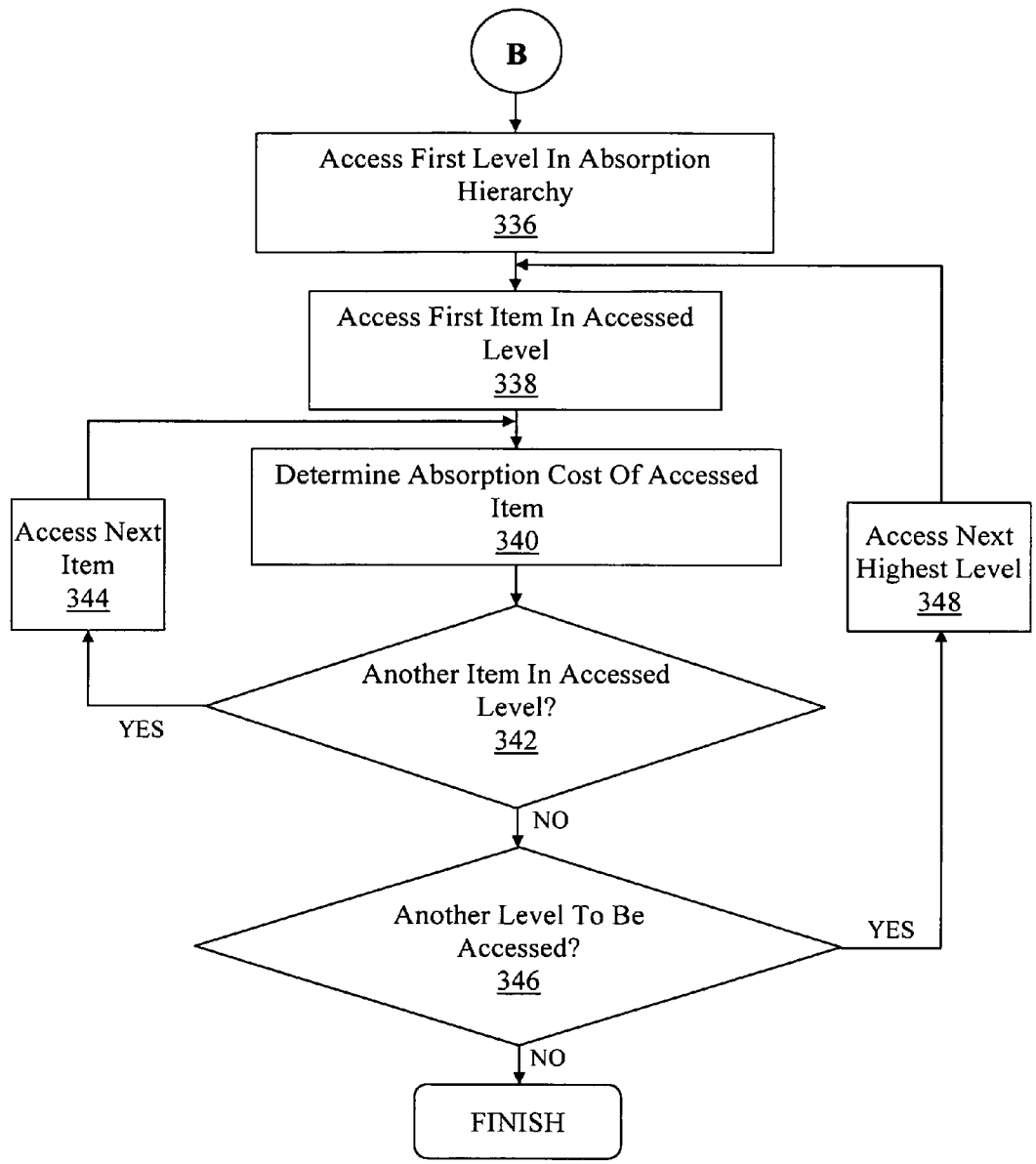
FIG. 3C shows a portion of a computer-implemented process for determining an absorption costing sequence from a modified hierarchy containing items transferred between a plurality of cost groups of a business operation in accordance with one embodiment of the present invention.

FIGS. 3A, 3B and 3C show computer-implemented process 300 for determining an absorption costing sequence for items transferred between a plurality of cost groups of a business operation in accordance with one embodiment of the present invention. As the steps of process 300 are described herein, reference will be made to FIG. 1, FIG. 2, Table 1, Table 2 and Table 3 to provide examples and help clarify the discussion.

FIG. 3A shows portion of a computer-implemented process 300 for creating an initial hierarchy from a bill of materials for subsequent use in determining an absorption costing sequence for items transferred between a plurality of cost groups of a business operation in accordance with one embodiment of the present invention. As shown in FIG. 3A, step 302 involves accessing a first item (e.g., that listed in a BOM for a business operation). Referring to FIG. 1, the item accessed in step 302 may be any of the items used by either cost group 110, 120 or 130 in one embodiment. After an item is accessed, all the BOM levels corresponding to an item (e.g., in which the item is used in various cost groups) are identified. For example, if the accessed item is item 145 as shown in FIG. 1, then BOM levels 999 and 1000 would be identified since cost group 110 uses item 145 at BOM level 999 and cost group 130 uses item 145 at BOM level 1000.

After all BOM levels are identified for an accessed item, the highest of the identified BOM levels is determined. In one embodiment, if the accessed item is item 145 as shown in FIG. 1, then the highest BOM level that item 145 is used at is BOM level 999 since BOM level 999 is higher than BOM level 1000. Thereafter, in one embodiment, the highest level determined in step 306 is assigned to the item in step 308 if the item is used in more than one cost group. Accordingly, since the highest BOM level for item 145 is 999, then BOM level 999 is assigned to item 145 in step 308 as shown in Table 2.

As shown in FIG. 3A, after the highest BOM level for an accessed item is assigned to that item, a determination is made in step 310 as to whether all items have been accessed. If an item has not been accessed, then step 312 is performed. In one embodiment, step 312 involves accessing the next item (e.g., that listed in a BOM for a business operation). For example, in one embodiment, if item 145 has already been accessed but item 155 has not, then item 155 may then be accessed in step 312. Thereafter, in one embodiment, steps 304 through 310 are performed for the newly-accessed item.

If it is determined that all items have been accessed in step 312, then an initial hierarchy is created in step 314. In one embodiment, the initial hierarchy may comprise the BOM levels assigned in step 308 for items used in more than one cost group (e.g., item 145). In another embodiment, the initial hierarchy may comprise a BOM level identified in step 304 for an item used in only one cost group (e.g., item 150). In one embodiment, the initial hierarchy created in step 314 for the scenario depicted in FIG. 1 may be represented by Table 2.

After an initial hierarchy is created, a first level is accessed in step 316 as shown in FIG. 3B. In one embodiment, the first accessed level may be the second-lowest level given that the items residing at the lowest level (e.g., BOM level 1000) are not parent items, and therefore, may not need to be repositioned. Accordingly, referring to Table 2, BOM level 999 is the second-lowest level. Upon accessing BOM level 999, items 145, 160 and 170 are found to be utilized by a cost group at level 999.

After accessing a first BOM level in step 316, a first item is accessed in the accessed level (e.g., the second-lowest BOM level 999 in the first iteration) in step 318. In one embodiment, referring to Table 2, item 145 may be accessed. In another embodiment, item 160 may be accessed. And in another embodiment, item 170 may be accessed.

As shown in FIG. 3B, all children items of the accessed item are identified in step 320. In one embodiment, where item 170 is accessed in step 318, three children items are identified in step 320: items 145; 155; and 165. Thereafter, in one embodiment, a determination is made in step 322 as to whether the accessed item is at a higher BOM level than all its respective children items. If the accessed item is at a higher level than all children items, then step 326 is performed in one embodiment. If the accessed item is not at a higher level than all children items, then the accessed item is repositioned in step 324. In one embodiment, parent item 170 is at BOM level 999, child item 145 is at level 999, child item 155 is at level 998, and child item 165 is at level 1000. Accordingly, item 170 may be repositioned in step 324 since it was not at a higher level than both item 145 (e.g., at level 999) and item 155 (e.g., at level 998).

If it is determined that the accessed item is not at a higher level than all its respective children items in step 322, then the accessed item may be moved to a level above the level of the highest respective child item. In one embodiment, item 170 may be moved to BOM level 997 such that it is placed at a level above the highest level in which a child item occupies (e.g., child item 155 at level 998).

As shown in FIG. 3B, step 326 involves making a determination as to whether another item exists in the accessed BOM level that has not yet been accessed. If another item exists in the accessed level that has not yet been accessed, then a next item is accessed in step 328. In one embodiment, steps 320 through 326 may then be performed for the next item accessed in step 328.

If all items within an accessed level have been accessed, then a determination may be made in step 330 as to whether another BOM level exists that has not yet been accessed. If another level exits that has not yet been accessed, then in one embodiment, a next highest level is accessed in step 332. Thereafter, steps 318 through 330 may be performed for the next level accessed in step 332.

If all BOM levels have been accessed, then a determination may be made in step 334 as to whether any items have been moved (e.g., in step 324) in the current iteration. If any items have been repositioned in the current iteration, then steps 316 through 334 are repeated for an initial hierarchy (e.g., that shown in Table 2). In one embodiment, if no items have been repositioned in the current iteration, then it may be determined that the hierarchy modified in steps 316 to 334 is an absorption hierarchy. The absorption hierarchy may contain eligible items, and therefore, be suitable for deriving an absorption costing sequence in the steps depicted in FIG. 3C.

Before proceeding with discussion of FIG. 3C, the portion of process 300 depicted in FIG. 3B may be further illustrated by discussing the steps taken to transform Table 2 into Table 3 in accordance with embodiments of the present invention. To begin, Table 1 may be reconfigured to list the items in each BOM level as shown in Table 4 below.

TABLE 4

| BOM Level | Item Number |
|---|---|
| 1000 | 150, 165 |
| 999 | 145, 160, 170 |
| 998 | 140, 155 |

After creating Table 4, reposition iterations (e.g., as determined by process 300 depicted in FIG. 3B) may then be performed to reposition the items within Table 4 and create an absorption hierarchy shown in Table 3. As discussed above, in one embodiment, only parent items need to be repositioned. As such, level 1000 need not be accessed since it contains no parent items to be repositioned.

First Reposition Iteration

Level 999:

Item 145 has one child item 150 at level 1000. Since item 145 is at a higher level than all of its children items, item 145 is eligible at level 999.

Item 160 has two children items: child item 140 at level 998 and child item 165 at level 1000. Since item 160 is at a lower level than its child item 140, item 160 should be repositioned to level 997.

Item 170 has three children items: child item 145 at level 999, child item 155 at level 998 and child item 165 at level 1000. Since item 170 is not at a higher level than its child item 155, item 170 should be repositioned to level 997.

Level 998:

Item 140 has two children items: item 145 at level 999 and item 150 at level 1000. Since item 140 is at a higher level than all of its children items, item 140 is eligible at level 998.

Item 155 has three children items: child item 140 at level 998, child item 160 at level 997 and child item 165 at level 1000. Since item 155 is not at a higher level than its child item 160, item 155 should be repositioned to level 996.

TABLE 5

| BOM Level | Item Number |
|---|---|
| 1000 | 150, 165 |
| 999 | 145 |
| 998 | 140 |
| 997 | 160, 170 |
| 996 | 155 |

Table 5 shows the hierarchy after the first reposition iteration. Since repositions were made in the first iteration, a second reposition iteration may be performed.

Second Reposition Iteration

Level 999:

Item 145 has one child item 150 at level 1000. Since item 145 is at a higher level than all of its children items, item 145 is eligible at level 999.

Level 998:

Item 140 has two children items: item 145 at level 999 and item 150 at level 1000. Since item 140 is at a higher level than all of its children items, item 140 is eligible at level 998.

Level 997:

Item 160 has two children items: child item 140 at level 998 and child item 165 at level 1000. Since item 160 is at a higher level than all of its children items, item 160 is eligible at level 997.

Item 170 has three children items: child item 145 at level 999, child item 155 at level 996 and child item 165 at level 1000. Since item 170 is not at a higher level than its child item 155, item 170 should be repositioned to level 995.

Level 996:

Item 155 has three children items: child item 140 at level 998, child item 160 at level 997 and child item 165 at level 1000. Since item 155 is at a higher level than all of its children items, item 155 is eligible at level 996.

TABLE 6

| BOM Level | Item Number |
|---|---|
| 1000 | 150, 165 |
| 999 | 145 |
| 998 | 140 |
| 997 | 160 |
| 996 | 155 |
| 995 | 170 |

Table 6 shows the hierarchy after the second reposition iteration. Since repositions were made in the second iteration, a third reposition iteration may be performed.

Third Reposition Iteration

Level 999:

Item 145 has one child item 150 at level 1000. Since item 145 is at a higher level than all of its children items, item 145 is eligible at level 999.

Level 998:

Item 140 has two children items: item 145 at level 999 and item 150 at level 1000. Since item 140 is at a higher level than all of its children items, item 140 is eligible at level 998.

Level 997:

Item 160 has two children items: child item 140 at level 998 and child item 165 at level 1000. Since item 160 is at a higher level than all of its children items, item 160 is eligible at level 997.

Level 996:

Item 155 has three children items: child item 140 at level 998, child item 160 at level 997 and child item 165 at level 1000. Since item 155 is at a higher level than all of its children items, item 155 is eligible at level 996.

Level 995:

Item 170 has three children items: child item 145 at level 999, child item 155 at level 996 and child item 165 at level 1000. Since item 170 is at a higher level than all of its children items, item 170 is eligible at level 995.

Since no repositions were made in the third iteration, no subsequent iterations need be performed. As such, Table 6 is an absorption hierarchy containing eligible items suitable for derivation of an absorption costing sequence.

After an absorption hierarchy is determined, a first level of the absorption hierarchy may be accessed in step 336 shown in FIG. 3C. In one embodiment, the first accessed level may be the lowest level containing only children items (e.g., level 1000). Upon accessing BOM level 1000 in Table 6, items 150 and 165 may be found to be utilized by a cost group at level 1000. After accessing a first BOM level, a first item is accessed in the accessed level in step 338. In one embodiment, referring to Table 6, item 150 may be accessed. In another embodiment, item 165 may be accessed.

After accessing an item in step 338, absorption costing is performed on the accessed item in step 340. In one embodiment, step 340 may be performed using the absorption costing method described in U.S. patent application Ser. No. 11/393,135, filed Mar. 29, 2006, entitled "IMPROVED METHOD AND SYSTEM FOR DETERMINING ABSORPTION COSTS FOR TRANSFERS BETWEEN INVENTORY SITES OF A BUSINESS OPERATION," naming V. Javli and L. Velasquez as inventors, assigned to the assignee of the present invention, which is incorporated herein by reference in its entirety and for all purposes.

As shown in FIG. 3C, step 342 involves making a determination as to whether another item exists in the accessed BOM level that has not yet been accessed. If another item exists in the accessed level that has not yet been accessed, then a next item is accessed in step 344. In one embodiment, steps 340 and 342 may then be performed for the next item accessed in step 344.

If all items within an accessed level have been accessed, then a determination may be made in step 346 as to whether another BOM level exists that has not yet been accessed. If another level exits that has not yet been accessed, then in one embodiment, a next highest level is accessed in step 348. Thereafter, steps 338 through 346 may be performed for the next level accessed in step 348. If all BOM levels have been accessed, then process 300 terminates.

Figure 4:
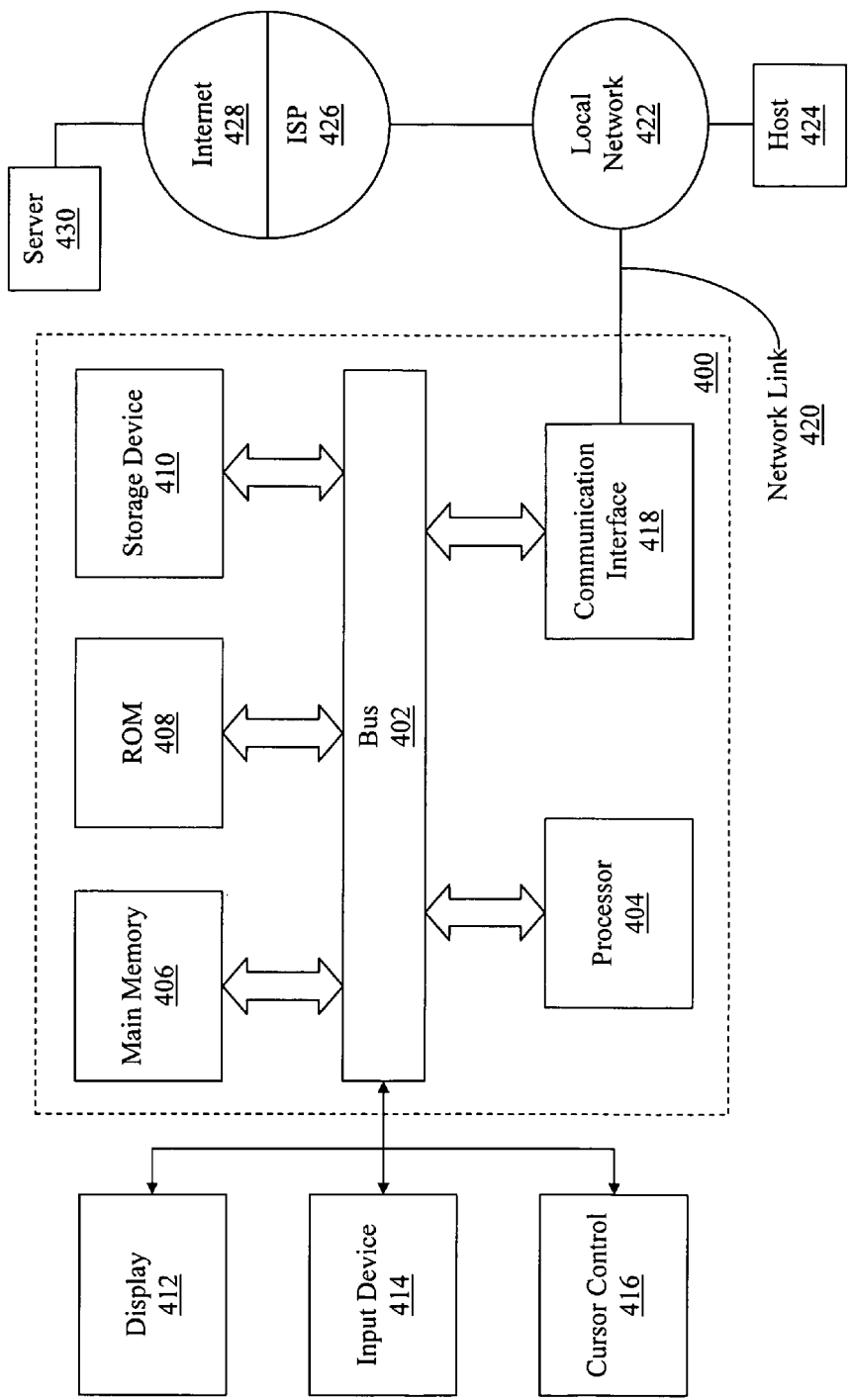
FIG. 4 shows an exemplary computer system upon which embodiments of the present invention may be implemented.

FIG. 4 shows exemplary computer system 400 upon which embodiments of the present invention may be implemented. With reference to FIG. 4, portions of the present invention are comprised of computer-readable and computer-executable instructions that reside, for example, in computer system 400 which may be used as a part of a general purpose computer network (not shown). It is appreciated that computer system 400 of FIG. 4 is merely exemplary. As such, the present invention can operate within a number of different computer systems including general-purpose computer systems, embedded computer systems, laptop computer systems, hand-held computer systems, and stand-alone computer systems.

In the present embodiment, computer system 400 includes an address/data bus 402 for conveying digital information between the various components, a central processor unit (CPU) 404 coupled to bus 402 for processing the digital information and instructions, a volatile main memory 406 coupled to bus 402 comprised of volatile random access memory (RAM) for storing the digital information and instructions, and a non-volatile read only memory (ROM) 408 coupled to bus 402 for storing information and instructions of a more permanent nature. In addition, computer system 400 may also include a data storage device 410 (e.g., a magnetic, optical, floppy, tape drive, etc.) coupled to bus 402 for storing larger amounts of data. It should be noted that the software program for performing the method for determining an absorption costing sequence for items in a business operation of the present invention may be stored in main memory 406, ROM 408, storage device 410, registers within processor 404 (not shown), and/or in an external storage device (not shown).

As shown in FIG. 4, computer system 400 may be coupled via bus 402 to an optional display device 412 (e.g., a CRT monitor, LCD monitor, etc.) for displaying information received from computer system 400. An optional input device 414 (e.g., an alphanumeric keyboard) may also be coupled to computer system 400 via bus 402 for communicating information and command selections to processor 404. Cursor control device 416 (e.g., a mouse, trackball, light pen, etc.) may also be coupled to computer system 400 via bus 402 for communicating direction information and command selections to processor 404 and for controlling cursor movement (e.g., on display 412). Additionally, computer system 400 can include a mechanism for emitting an audible signal (not shown).

Computer system 400 may also include a communication interface 418 coupled to bus 402. Communication interface 418 provides a two-way data communication coupling to local network 422 via network link 420. For example, communication interface 418 may be an integrated services digital network (ISDN) device or a modem to provide a data communication connection to a corresponding type of telephone line. As another example, communication interface 418 may be a local area network (LAN) device to provide a data communication connection to a compatible LAN. And as yet another example, network link 420 may comprise a wireless connection between communication interface 418 and local network 422. Regardless of the implementation utilized, communication interface 418 may send and receive electrical, electromagnetic, and/or optical signals that carry digital data streams representing various types of information.

As shown in FIG. 5, network link 520 may provide data communication through one or more networks to other data devices. For example, network link 520 may provide a connection through local network 522 to a host computer 524 or to data equipment operated by internet service provider (ISP) 526. ISP 526 in turn provides data communication services through the worldwide packet data communication network, now commonly referred to as the "internet" 528. Local network 522 and internet 528 may use electrical, electromagnetic, and/or optical signals to convey digital data streams. The signals through the various networks and network link 520, which carry digital data to and from computer system 500, are exemplary forms of carrier waves transporting information.

Accordingly, computer system 400 can send and receive messages through network(s), network link 420, and communication interface 418. For example, server 430 might transmit a requested code for an application program through internet 428, ISP 426, local network 422, and communication interface 418. The received code may be executed by processor 404 upon receipt, and/or be stored in one of the coupled memory devices (e.g., storage device 410, ROM 408, RAM 406, etc.) for later execution.

The preferred embodiment of the present invention, an improved method and system for determining an absorption costing sequence for items in a business operation, is thus described. While the present invention has been described in particular embodiments, it should be appreciated that the present invention should not be construed as limited by such embodiments, but rather construed according to the following claims.

What is claimed is:

1. A computer-implemented method of sequencing items for absorption costing, said items classified according to a classification identifying parent-child relationships of said items, said method comprising:

creating at a computer system an initial hierarchy comprising said items, each of said items associated with a hierarchy level of a plurality of hierarchy levels based on one or more cost groups in which each of said items is located, each cost group representing one or more inventory sites;

modifying at the computer system said initial hierarchy using a first iterative process to reposition a plurality of said items in the plurality of hierarchy levels, wherein said first iterative process generates a modified hierarchy and comprises:

accessing an item in the hierarchy, said accessed item associated with an accessed hierarchy level;

identifying a second item in the hierarchy, wherein the second item corresponds to a child item of the accessed item in the classification;

upon determining that the hierarchy level associated with the second item is higher in the hierarchy than the accessed hierarchy level, changing the position of the accessed item in the hierarchy such that the accessed item is associated with a new hierarchy level different from the accessed hierarchy level and wherein the new hierarchy level is above the hierarchy level associated with the second item;

repeating, using the computer system, said modifying until an iteration is completed without repositioning any of said plurality of said items in the hierarchy;

determining, using the computer system, an absorption costing sequence for said items from said modified hierarchy for the iteration completed without repositioning any of said plurality of said items in the hierarchy;

calculating, using the computer system and said absorption costing sequence in a second iterative process, the cost of an item of said plurality of cost groups; and repeating said second iterative process using the computer system until the costs of a plurality of items of said plurality of cost groups have been calculated.

2. The method of claim 1, wherein said classification is a bill of materials and wherein said initial hierarchy is derived from the bill or materials.

3. The method of claim 1, wherein the new hierarchy level is above all hierarchy levels containing children of said accessed item.

4. The method of claim 1, wherein said accessed item corresponds to a parent item.

5. The method of claim 1, wherein said accessed item is only accessed once per iteration.

6. The method of claim 1, wherein said creating at the computer system an initial hierarchy further comprises:
   identifying at least one of said items associated with a plurality of hierarchy levels, wherein said plurality of hierarchy levels comprises a respective hierarchy level of said at least one of said items for each respective cost group using said at least one of said items; and
   assigning said at least one of said items to the highest hierarchy level of said plurality of hierarchy levels.

7. A computer-usable medium having computer-readable program code embodied therein for causing a computer system to perform a method of sequencing items for absorption costing, said items classified according to a classification identifying parent-child relationships of said items, said method comprising:
   creating an initial hierarchy comprising said items, each of said items associated with a hierarchy level of a plurality of hierarchy levels based on one or more cost groups in which each of said items is located, each cost group representing one or more inventory sites;
   modifying said initial hierarchy using a first iterative process to reposition a plurality of said items in the plurality of hierarchy levels, wherein said first iterative process generates a modified hierarchy and comprises:
      accessing an item in the hierarchy, said accessed item associated with an accessed hierarchy level;
      identifying a second item in the hierarchy, wherein the second item corresponds to a child item of the accessed item;
      upon determining that the hierarchy level associated with the second item is higher in the hierarchy than the accessed hierarchy level, changing the position of the accessed item in the hierarchy such that the accessed item is associated with a new hierarchy level different from the accessed hierarchy level and wherein the new hierarchy level is above the hierarchy level associated with the second item; and
   repeating said modifying until an iteration is completed without repositioning any of said plurality of said items in the hierarchy;
   determining an absorption costing sequence for said items from said modified hierarchy;
   calculating, using said absorption costing sequence in a second iterative process, the cost of an item of said plurality of cost groups; and
   repeating said second iterative process until the costs of a plurality of items of said plurality of cost groups have been calculated.

8. The computer-usable medium of claim 7, wherein said initial hierarchy is derived from a bill of materials.

9. The computer-usable medium of claim 7, wherein the new hierarchy level is above all hierarchy levels containing that correspond to children of said accessed item.

10. The computer-usable medium of claim 7, wherein said accessed item is a parent item.

11. The computer-usable medium of claim 7, wherein said accessed item is only accessed once per iteration.

12. The computer-usable medium of claim 7, wherein said creating an initial hierarchy further comprises:
   identifying a plurality of hierarchy levels for an item in the hierarchy, wherein said plurality of hierarchy levels comprises a respective hierarchy level of said items for each respective cost group using said items; and
   assigning a higher hierarchy level of said plurality of hierarchy levels to said item.

13. A computer-implemented method of sequencing items for costing, said items classified according to a classification identifying parent-child relationships of said items, said method comprising:
   creating at a computer system an initial processing hierarchy comprising said items, each of said items associated with one of a plurality of hierarchy levels based on one or more cost groups in which each of said items is located, each cost group representing one or more inventory sites;
   modifying, using the computer system, said initial processing hierarchy using first iterative process to reposition at least one of said items in the initial processing hierarchy, wherein said first iterative process generates a modified processing hierarchy and comprises:
      identifying one of said at least one of said items as an accessed item, said accessed item associated with an accessed hierarchy level;
      moving said accessed item within the initial processing hierarchy to a hierarchy level above the highest hierarchy level associated with a second item, wherein the accessed item corresponds to a parent of the second item in the classification; and
      performing said identifying and said moving for any items in said accessed hierarchy level that remain to be identified as accessed items;
   repeating said modifying until an iteration is completed without repositioning any of said plurality of said items in the hierarchy;
   determining an absorption costing sequence for said items based on the position of said items in the modified hierarchy;
   calculating, using said absorption costing sequence in a second iterative process, the cost of an item of said plurality of cost groups; and
   repeating said second iterative process until the costs of a plurality of items of said plurality of cost groups have been calculated.

14. The method of claim 13, wherein said initial hierarchy is derived from a bill of materials.

15. The method of claim 13, wherein repeating said modifying is performed for successively higher hierarchy levels.

16. The method of claim 13, wherein said accessed item corresponds to an item that is a parent item in the classification.

17. The method of claim 13, wherein said accessed item is only accessed once per iteration.

18. The method of claim 13, wherein said creating an initial hierarchy further comprises:
   identifying a plurality of hierarchy levels for an item in the hierarchy, wherein said plurality of hierarchy levels comprises a respective hierarchy level of said items for each respective cost group using said items; and
   assigning a higher hierarchy level of said plurality of hierarchy levels to said item.

* * * * *